(12) United States Patent
Yu et al.

(10) Patent No.: US 10,836,543 B2
(45) Date of Patent: Nov. 17, 2020

(54) CONTAINER INCLUDING A CASE AND A CASE COUPLER

(71) Applicant: LG Electronics Inc., Seoul (KR)

(72) Inventors: Seonil Yu, Seoul (KR); Hyun Choi, Seoul (KR); Junyi Heo, Seoul (KR)

(73) Assignee: LG Electronics Inc., Seoul (KR)

( * ) Notice: Subject to any disclaimer, the term of this patent is extended or adjusted under 35 U.S.C. 154(b) by 268 days.

(21) Appl. No.: 15/986,127

(22) Filed: May 22, 2018

(65) Prior Publication Data

US 2019/0127126 A1 May 2, 2019

(30) Foreign Application Priority Data

Oct. 27, 2017 (KR) .......................... 10-2017-0140894

(51) Int. Cl.
| | | |
|---|---|---|
| *B65B 43/16* | (2006.01) | |
| *B65D 25/28* | (2006.01) | |
| *A47J 47/08* | (2006.01) | |
| *A47G 23/04* | (2006.01) | |
| *B65D 43/16* | (2006.01) | |

(52) U.S. Cl.
CPC ........... *B65D 43/166* (2013.01); *A47G 23/04* (2013.01); *A47J 47/08* (2013.01); *B65D 25/2858* (2013.01); *B65D 2543/0087* (2013.01); *B65D 2543/00194* (2013.01); *B65D 2543/00342* (2013.01)

(58) Field of Classification Search
CPC ...... B65D 51/242; B65D 51/24; B65D 51/18; B65D 43/166; B65D 43/164; B65D 43/163; B65D 43/16; B65D 25/2858; B65D 25/2835; B65D 45/16; A47G 23/04; A47J 47/08; F25D 3/08; A45C 11/20
USPC ............ 220/212.5, 212, 254.3, 254.1, 259.1, 220/256.1, 324, 315, 840, 763, 762, 220/915.2, 915.1, 592.03
See application file for complete search history.

(56) References Cited

U.S. PATENT DOCUMENTS

| | | | | |
|---|---|---|---|---|
| 2,239,128 | A * | 4/1941 | Sykes ................ | B65D 81/3818 312/400 |
| 5,718,350 | A * | 2/1998 | Williams ........... | B65D 21/0219 220/326 |
| 7,445,116 | B2 * | 11/2008 | Dansaert .............. | A61B 50/362 206/366 |
| 7,458,481 | B2 * | 12/2008 | Yuen ...................... | A45C 11/20 220/737 |
| 8,016,153 | B2 * | 9/2011 | Boenig ................ | A45C 13/005 220/4.22 |
| 9,114,909 | B2 * | 8/2015 | Wagner ............. | B65D 21/0233 |

(Continued)

*Primary Examiner* — Robert J Hicks
(74) *Attorney, Agent, or Firm* — Fish & Richardson P.C.

(57) ABSTRACT

A container includes a case that defines a storage space and an opening at a top surface of the case, a case coupler that is configured to couple to an upper edge of at least one of the lateral walls of the case, the case coupler including a shaft, a cover fixing unit configured to couple to the shaft of the case coupler and to rotate about the shaft, a cover configured to detachably couple to an upper side of the case coupler and configured to open and close at least a portion of the opening of the case, and a hinge that is coupled to the cover and that defines a seating portion configured to receive the shaft, the cover being configured to rotate about the shaft. The cover fixing unit comprises cover fixing units that are located, respectively, at lateral walls of the case that face each other.

20 Claims, 8 Drawing Sheets

(56) References Cited

U.S. PATENT DOCUMENTS

2015/0253055 A1\* 9/2015 Tsui ................... B65D 21/086
  62/62
2017/0129097 A1\* 5/2017 Engvall ................. B25H 1/04

\* cited by examiner

CONTAINER INCLUDING A CASE AND A CASE COUPLER

CROSS-REFERENCE TO RELATED APPLICATIONS

This application claims priority to Korean Patent Application No. 10-2017-0140894, filed on Oct. 27, 2017, in Korea, the entire contents of which is hereby incorporated by reference in its entirety.

FIELD

The present disclosure relates to a container and, for example, a container for kimchi.

BACKGROUND

A refrigerator may include a mechanical chamber which may be mounted in a lower area of a main body. For example, the mechanical chamber may be mounted in a lower or bottom area of the refrigerator to keep the weight center of the refrigerator low and to improve assembly efficiency and vibration reduction.

In some examples, the mechanical chamber of the refrigerator may include parts of a freezing cycle structure. A freezing cycle, in which liquid refrigerant is changed into gaseous refrigerant, and heat is absorbed from an inside of the refrigerator, may maintain the inside of the refrigerator at a refrigerated or frozen state so as to preserve food items fresh.

The freezing cycle structure of the refrigerator may include a compressor configured to change low-temperature-low-pressure gaseous refrigerant into high-temperature-high-pressure gaseous refrigerant, a condenser configured to change the high-temperature-high-pressure gaseous refrigerator into high-temperature-high-pressure liquid refrigerant, and an evaporator configured to change the low-temperature-high-pressure liquid refrigerant into gaseous stated refrigerator, while absorbing external heat.

In some examples, a special container may be used to keep kimchi in the refrigerator. In some cases, Kimchi may contain a low level of moisture and may be heavy, compared with other types of food. In addition, since gas may be generated from kimchi, for example, during the ripening period, kimchi may be stored in an airtight container by a preset level or more.

Considering the characteristics of kimchi described above, there are ongoing studies and researches on a container for kimchi which has advanced user friendliness.

SUMMARY

One object of the present disclosure is to provide a container for kimchi which has advanced user friendliness.

Another object of the present disclosure is to provide a container for kimchi that includes a cover configured to facilitate opening of the container when a user stores or takes out kimchi in or from the container.

A further object of the present disclosure is to provide a container for kimchi which can facilitate movement of the container in a state in which the container is filled with kimchi.

According to one aspect of the subject matter described in this application, a container includes a case that include lateral walls and a bottom surface that define a storage space, in which the case defines an opening at a top surface of the case, a case coupler that is configured to couple to an upper edge of at least one of the lateral walls of the case, in which the case coupler comprises a shaft, a cover fixing unit configured to couple to the shaft of the case coupler and to rotate about the shaft, a cover configured to detachably couple to an upper side of the case coupler and configured to open and close at least a portion of the opening of the case, and a hinge that is coupled to the cover and that defines a seating portion configured to receive the shaft, in which the cover is configured to rotate about the shaft. The cover fixing unit includes cover fixing units that are located, respectively, at lateral walls of the case that face each other.

Implementations according to this aspect may include one or more of the following features. For example, the seating portion may define an open hole that is defined at a lower area of the hinge, and the shaft is configured to insert into or be released from the seating portion through the open hole. The shaft may include a first end and a second end that are each configured to couple to the cover fixing unit, and a center portion that is located between the first end and the second end and that is configured to support the seating portion of the hinge. The container may further include a shaft supporter that is coupled to the case coupler and that includes the shaft.

In some implementations, the cover fixing unit may further include a first extended portion that has a planar shape, and a second extended portion that extends from the first extended portion in a direction transverse to the first extended portion. The hinge may define a coupling groove configured to receive the second extended portion of the cover fixing unit. The coupling groove may extend toward one of the lateral walls, and the first extended portion may be configured to contact the cover based on insertion of the second extended portion to the coupling groove.

In some implementations, the cover fixing unit may further include a first extended portion that has a planar shape, and a third extended portion that extends downward from the first extended portion toward the bottom surface of the case. The case coupler may include a contact surface that protrudes from at least one of the lateral walls, where the third extended portion is configured to contact the contact surface of the case coupler based on rotation of the cover fixing unit about the shaft, and the contact surface is configured to limit rotation of the cover fixing unit based on the third extended portion contacting the contact surface.

In some implementations, the container may further include a handle located at a top surface of the cover. The cover may include a handle shaft that is configured to rotatably couple to the handle, and the handle shaft is located at an edge of the cover that corresponds to a side of at least one of the lateral walls that is configured to couple to the cover fixing unit. The cover fixing unit may extend upward by a first distance vertically above the cover, and the handle protrudes upward from the cover by a second distance that is less than or equal to the first distance. In some examples, the handle may include a pair of first connecting portions in which each first connecting portion having a first end rotatably coupled to the handle shaft, and a second connecting portion that connects second ends of the pair of first connecting portions to each other. The cover may include a projection configured to limit a rotation angle of the handle less than 90 degrees.

In some implementations, the cover may include a transparent window in a center area of the cover. In some examples, a shape of the container is symmetric with respect to a plane that passes through a center of one of the lateral walls. The case coupler, the cover fixing unit, and the hinge are arranged at a first side of the container with respect to the plane, and the container may further include a second case coupler, a second cover fixing unit, and a second hinge that are arranged at a second side with respect to the plane opposite to the first side. The case coupler may include case couplers that are located at the lateral walls of the case that face each other, respectively. The hinge may include hinges that are located at edges of the cover that face each other, respectively. Each of the case couplers may include a shaft configured to rotatably couple to one of the hinges, and the cover is configured to rotate about the shaft that contacts one of the hinges.

According to at least one of the implementations, a user may be able to open the cover easily and have an easy access to the kimchi stored in the container.

In some examples, the user may be able to move the container by using the handle.

In some examples, the user may be able to open the cover and have access to kimchi in a state where the cover is coupled to one side of the container. Accordingly, the inconvenience of moving the cover to another location can be reduced.

Further scope of applicability of the present disclosure will become apparent from the detailed description given hereinafter. However, it should be understood that the detailed description and specific examples, while indicating example implementations of the disclosure, are given by illustration only, since various changes and modifications within the spirit and scope of the disclosure will become apparent to those skilled in the art from this detailed description.

DETAILED DESCRIPTION

Referring to the accompanying drawings, exemplary implementations of the present disclosure will be described in detail.

Regardless of numeral references, the same or equivalent components may be provided with the same reference numbers and description thereof will not be repeated. For the sake of brief description with reference to the drawings, the sizes and profiles of the elements illustrated in the accompanying drawings may be exaggerated or reduced and it should be understood that the implementations presented herein are not limited by the accompanying drawings.

Figure 1:
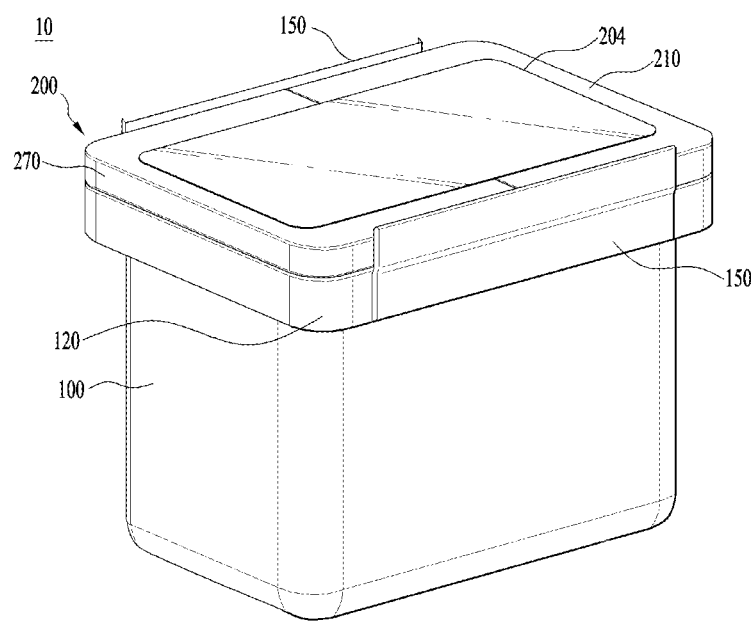
FIG. 1 is a perspective view illustrating an example container for kimchi.

FIG. 1 illustrates an example container according to one implementation of the present disclosure.

Referring to FIG. 1, a container 10 (e.g., a kimchi container) includes a case 100 defining a storage space to store kimchi, and a cover 200 arranged in a top of the case 100.

For example, the case 100 may be made of plastic or metal and have an approximately rectangular shape with four lateral walls and one bottom surface. Kimchi may be stored in the space defined by the four lateral walls and the bottom surface, with the water contained in Kimchi.

The kimchi container 10 may include a case coupling unit 120 that defines a top exterior appearance of the case 100 and that is located at the case 100. Upper edges of the case 100 may have a same thickness with the lateral walls and bottom surface. In some examples, to secure hardness, the case coupling unit 120 thicker than the lateral walls may finish the upper edges of the case 100. In some examples, structural elements for fixing the cover, which will be described later, may be installed in the case coupling unit 120.

The cover 200 may be located at a top of the case coupling unit 120 and configured to open and close an opening defined in the top of the case 100. A transparent window 204 may be provided in a center area of the cover 200 to make an inside of the case 100 visible from outside of the case 100.

A user is able to check the state or amount of the kimchi stored in the case, even without separating the cover 200 from the case 100. A rim 210 of the transparent window 204 may be made of a non-transparent material, different from the transparent window, to finish the edge of the transparent window 204. The rim 210 may be made of a stronger material than the transparent window 204 and form an outer surface of the cover so as to form a structure for disposing the cover 200 on the case coupling unit 120.

The case coupling unit 120 may be formed along the four lateral walls of the case 100. Viewed from above, the case coupling unit 120 may have an entirely rectangular shape. Also, the case coupling unit 120 may be coupled to upper surfaces of all the four lateral walls.

Two cover fixing units 150 may be provided in two facing lateral walls, respectively. The cover fixing unit 150 may be arranged in two opposite sides of the rectangular shape of the case coupling unit 120 to secure the cover 200.

The cover fixing unit 150 is level with an upper surface of the cover 200 or extended upwardly to be a little bit higher than the upper surface of the cover 200. The user is able to separate the cover 200 from the case 100 by rotating one of the cover fixing units 150 downwardly.

A handle 270 may be provided in a predetermined area of the cover 200 so that the user can hold the handle in the hand to move the kimchi container 10.

Figure 2:
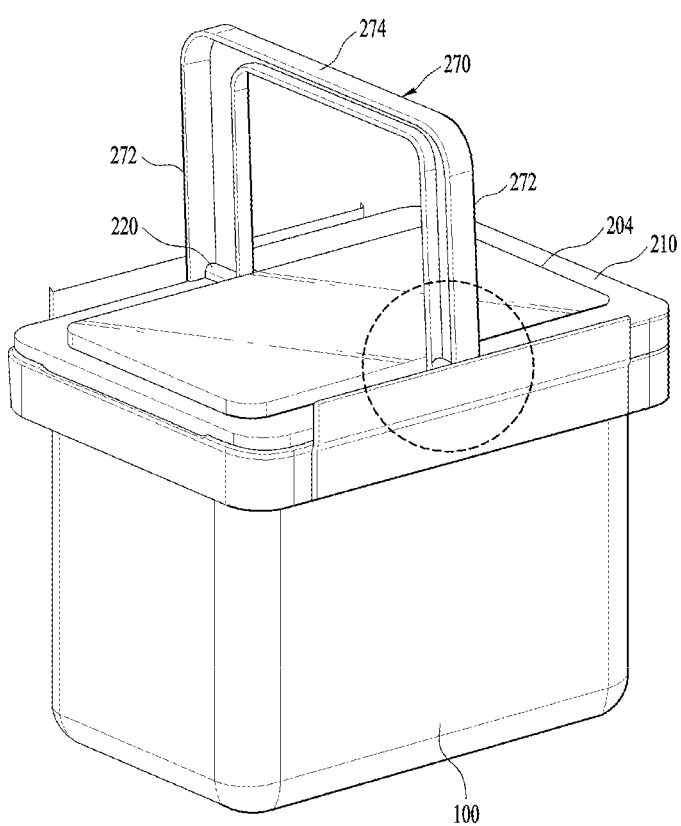
FIG. 2 is a perspective view illustrating an example handle of the container of FIG. 1 in a state in which the handle is rotated.
Figure 3:
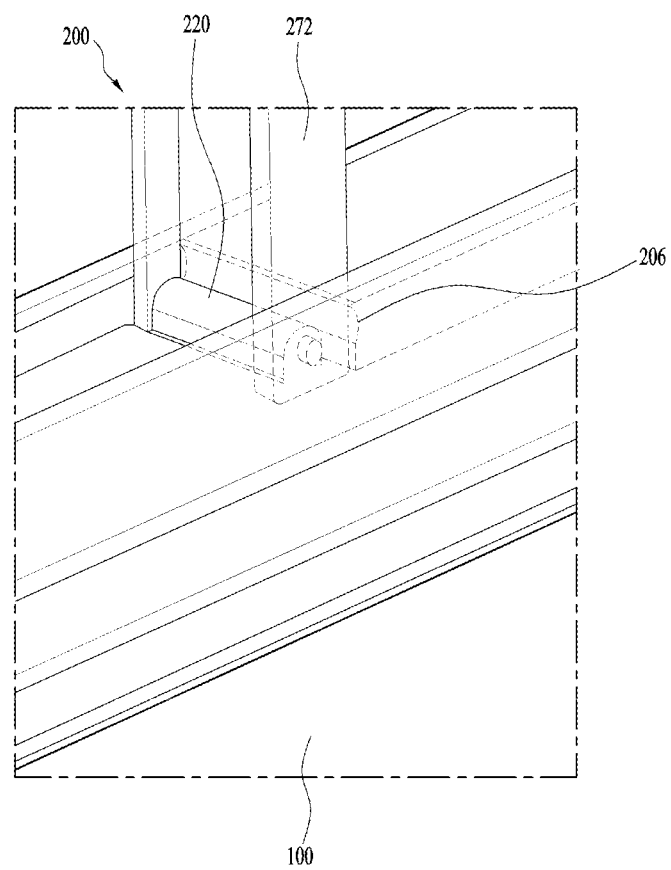
FIG. 3 is an enlarged diagram illustrating an example coupling area between the handle and an example handle shaft of FIG. 2.

FIG. 2 illustrates an example handle that is rotated from the container of FIG. 1. FIG. 3 is an enlarged diagram illustrating a coupling area between the handle and an example handle shaft of FIG. 2.

Referring to FIGS. 2 and 3, the user may rotate the handle 270 with respect to the cover 200 and hold it to move the kimchi container 10.

A handle shaft 220 may be provided in the cover 200 and the handle is rotatably coupled to the handle shaft 220. The handle shaft 220 may be provided in an edge of the cover 200 which is corresponding to the lateral wall having the cover fixing unit 150 installed therein.

In some implementations, the handle 270 may include two first connecting portions 272 that are rotatably connected to the handle shaft 220, and a second connecting portion 274 that connects both ends of the two first connecting portions 272 with each other.

The handle 270 may have a '⊏'-shape and the first connecting portions 272 are rotatably coupled to the handle shaft 220 provided in the cover 200.

A projection 206 is provided in the cover which faces one end of the first connecting portion and the projection 206 may limit the handle 270 from rotating 90 degrees or more. The projection 206 may be provided adjacent to the handle shaft 220 and located to face one end of the first connecting portion. Accordingly, the projection 206 may contact a surface of the first connecting portion 272 to limit the first connecting portion 272 from being rotated 90 degrees or more.

The user may rotate the handle within a designed range and can manipulate the handle within the designed range while keeping a state where the handle 270 of the kimchi container is stably coupled to the cover 200.

Each of the first and second connecting portions 272 and 274 may include three surfaces and one opening, which can maintain the strength of the handle 270 and reduce the weight.

In some examples, the two first connecting portions 272 may have an outer width that is larger than an inner width so as to differentiate the widths of the first connecting portions 272 from each other.

Figure 4:
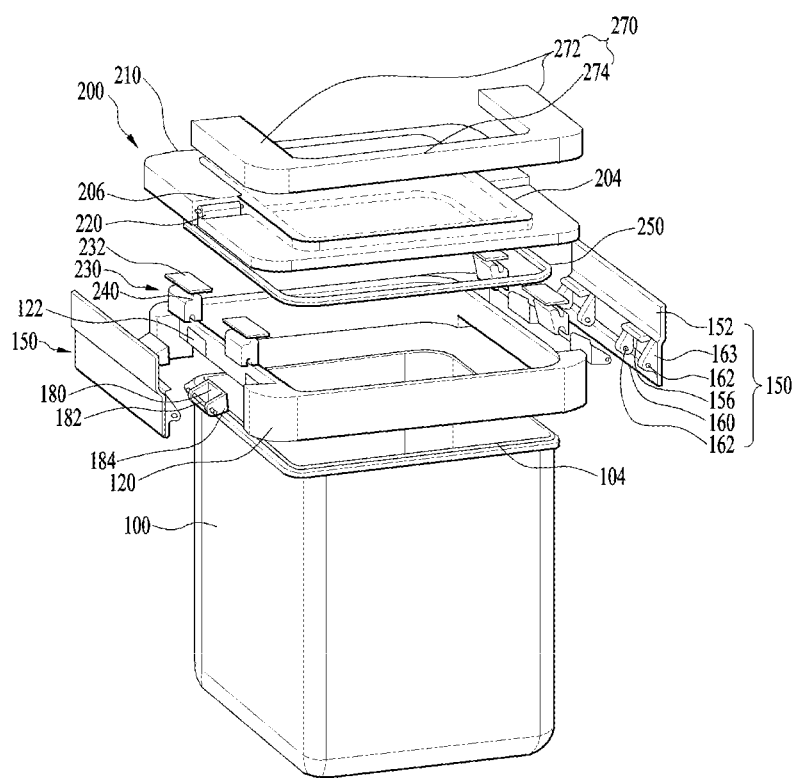
FIG. 4 is an exploded perspective diagram of FIG. 1.

FIG. 4 is an exploded perspective diagram of FIG. 1.

Referring to FIG. 4, the kimchi container 10 includes the case 100 which may store kimchi, the case coupling unit 120 provided in the top of the case 100, and the cover fixing unit 150 coupled to the case coupling unit 120.

The cover 200 is large enough to finish the opening of the case 100 and detachably coupled to a top of the case coupling unit 120.

The cover 200 has a hinge 230 to be rotatable from the case coupling unit 120. The hinge 230 may be arranged in both edges of the cover 200 which face each other.

The exterior design of the case coupling unit 120 is entirely larger than the opening 104 of the case 100. When coupled to the case 100, the case coupling unit 120 become arranged even to a position out of a rime of the lateral wall provided in the case 100. The case coupling unit 120 is fitted to the four lateral walls by pressing or adhesion.

A shaft fixing unit 180 having a shaft 182 may be provided in each of two edges of the case coupling unit 120 and the shaft 182 has a long-circular shape. The shaft fixing units 180 are arranged in the surfaces where the cover fixing units 150 are arranged, respectively. The shaft fixing unit 180 may support the shaft 182.

In some implementations, two shaft fixing units 180 may be arranged in one surface, and it is possible to arrange additional shaft fixing units 180 in the one surface. In some examples, the shaft fixing units 180 may be arranged in two of the lateral walls which face each other, and the same number of the shaft fixing units 180 may be arranged in each of the two walls which face each other.

The shaft fixing unit 180 has extended pieces 184 which are provided in both ends with respect to a body defining a center, respectively. The shaft 182 is arranged through the two extended pieces 184. The shaft 182 has the area which penetrates the space defined between the two extended pieces 184 and the extended pieces 184 to reach out of the extended pieces 184.

A seating groove 122 may be formed in the case coupling unit 120 and the body of the shaft fixing unit 180 may be coupled to the seating groove 122. The seating grooves 122 may be formed as many as the shaft fixing units 180 so that they can be secured to the case coupling unit 120 stably.

The cover fixing unit 150 may be rotatably coupled to the shaft 182. A hole 162 may be formed in each of the cover fixing units 150 so that the area of the shaft 182 located out of the extended piece 184 is inserted in the hole 162. Two holes 162 may be provided for one shaft 182, so that the cover fixing units may be secured to both ends of the shaft 182.

The cover fixing unit 150 includes a first extended portion 152 which has a plate shape, a second extended portion 156 vertically extended from the first extended portion 152, and a third extended portion 160 extended downwardly from the first extended portion 152. The cover fixing unit 150 may be arranged in a '⊢'-shape.

The first extended portion 152 forms a level surface for covering one surface of the cover 200, with a wide area of the level surface which faces the surface of the cover 200.

The third extended portion 160 may be extended to have a step with respect to the first extended portion 152. In this instance, the third extended portion 160 may be also extended downwardly to have the same width with the first extended portion 152, so that it may cover an upper area of one side wall provided in the case 100.

The second extended portion 156 may be configured of two projected areas which are projected from the first extended portion 152 perpendicularly. The number of the second extended portions 156 may be equal to that of the shaft fixing units 180.

The second extended portion 156 may be provided over a rib 163 including the hole 162 which is inserted by the shaft 182.

Two ribs 163 are corresponding to one shaft and one hole 162 is formed in each of the ribs 163, so that one shaft may be inserted in the holes, corresponding to two ribs 163.

The rib 163 may be extended in the same direction as the first extended portion 152 is extended downwardly, while it is perpendicular to the first extended portion 152, only to secure the strength.

The second extended portion 156 may be arranged between the two ribs 163 so that two second extended portions 156 may be provided in one cover fixing unit 150.

The hinge 230 includes a coupling surface 232 which is configured to be coupled to the cover 200. The coupling surface 232 is level to be coupled to a lower surface of the cover 200.

A body portion 234 is formed under the coupling surface 232, and a seating hole 236 is formed under the body portion 234 to be seated in the shaft 182. A diameter of the seating hole 236 is equal to or larger than a diameter of the shaft 182 and the seating hole 236 is located above the shaft 182.

An open hole 238 is provided under the seating hole 236 so that the shaft 182 may move into or out of the seating hole 236.

The seating hole 236 may be formed in the area where the shaft 182 is arranged between the two ribs 163.

Both ends of the shaft 182 are inserted in the holes 162 formed in the ribs 163 to be coupled to the cover fixing unit 150. The seating hole 136 of the hinge 230 is seated on the center of the shaft 183 to support the hinge 230. The shaft 182 may provide the structure configured to fix the cover fixing unit 150 and the cover 200 together.

A gasket 250 may be provided in the lower surface of the cover 200. When the cover 200 closes the opening 104 of the case 100 airtight, the gas generated from kimchi may be prevented from leaking out of the cover 200 by the gasket 250.

The cover 200 may be coupled to the case 100 by the two cover fixing units 150 to close the opening 104 airtight. Accordingly, the user is able to separate the cover from the kimchi container easily, compared with the conventional container of which the cover is secured by the four coupling units.

FIGS. 5A through 8B are diagrams illustrating example operations of an example container according to another implementation of the present disclosure. This example, as shown in FIGS. 5A through 8B, includes features of the implementation mentioned above except for the handle.

In some examples, for user friendliness, the handle type container may be provided to be easily moved by the user. In other examples, the no-handle type container may be provided if the user prefers a clean design without a handle located at the top of the container.

In FIGS. 5A through 8B, a numeral number of 100 means the area of the lateral walls provided in the case 110.

Also, in FIGS. 5A through 8B, FIGS. 5A, 6A, 7A, and 8A show an overall operation of the kimchi container, and FIGS. 5B, 6B, 7B, and 8B show changes of the case coupling unit, the cover fixing unit, the cover and the hinge in a state of each operation.

Figure 5A:
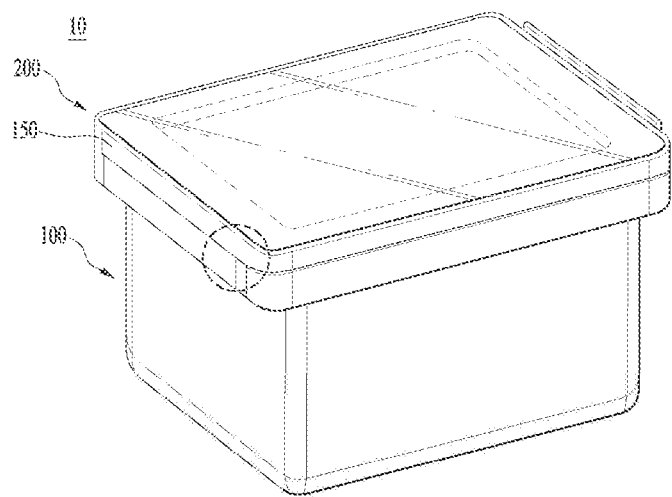
FIGS. 5A through 8B are diagrams illustrating example operations of an example container for kimchi.

As shown in FIG. 5A, the user may couple the cover 200 to the top of the case 100 after storing kimchi in the case 100. The kimchi stored in the case 100 is kept airtight by the case 100 and the cover 200 so that the gas or the like generated as kimchi is fermented may be closed airtight, without leaking.

Figure 5B:
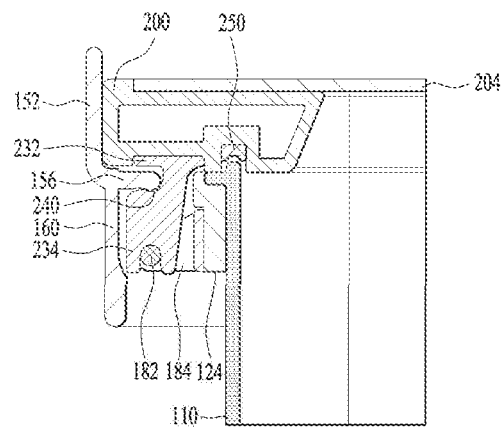

As shown in FIG. 5B, the first extended portion 152 of the cover fixing unit 150 is arranged in contact with one surface of the cover, in a state where the cover 200 is coupled to the case 100 to store kimchi airtight. The third extended portion 160 is also arranged along the first extended portion 152 downwardly to face one surface of the body portion 234 of the hinge.

In some implementations, a coupling groove 240 is defined in the hinge 230 and configured to receive the second extended portion 156. The coupling groove 240 may extend horizontally. When the second extended portion 156 is inserted in the coupling groove 240, the first extended portion 152 is arranged to face the surface of the cover to prevent the cover 200 from separating from the case 100.

In some implementations, the coupling groove 240 may provide the structure configured to insert the second extended portion 156 in the coupling groove 240, when the first and third extended portions 152 and 160 are arranged perpendicular to the ground and the second extended portion 156 is arranged horizontal to the ground, only to couple the cover 200 to the case 100.

As shown in FIGS. 5A and 5B, in a state where the cover 200 is closing the case 100 airtight, the seating hole 236 of the hinge 230 is kept in siting on the top of the shaft 182.

In some implementations, a projected surface 124 projected from the lateral wall of the case 100 is provided in a lower end of the case coupling unit 120. The projected surface 124 may be perpendicular to the lateral wall of the case 100 and extended from the lateral wall outwardly.

When desiring to store or take out kimchi in or out of the kimchi container, the user has to decouple the cover 200 from the case 100. In the latter implementation as well as the former implementation, the user is able to open the opening 104 even without separating the cover 200 from the case 100 completely. In other words, the user is able to store or take out kimchi by opening the opening 104 completely, while keeping one side of the cover 200 in contact with the case 100.

Figure 6A:
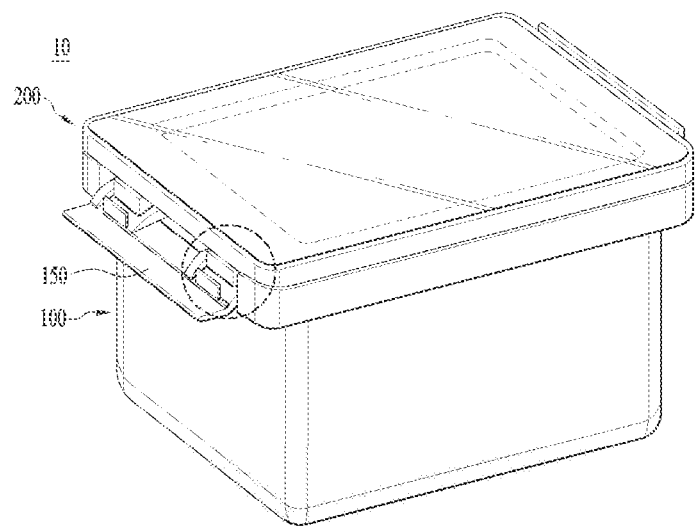
Figure 6B:
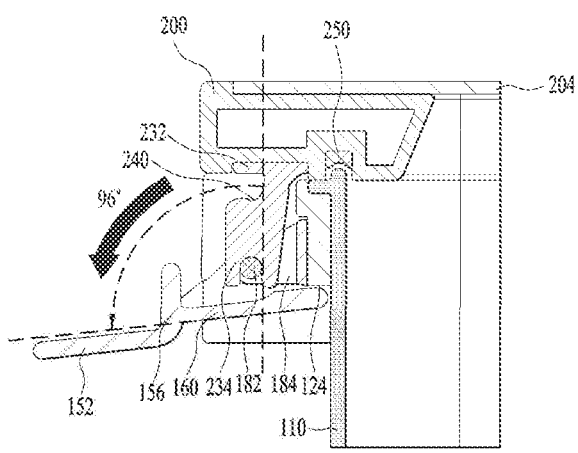

To open the opening 104, the user may move the first extended portion 152 of the cover fixing unit 150 downwardly as shown in FIGS. 6A and 6B. The cover fixing unit 150 is rotatable on the shaft 182 and the cover fixing unit 150 is substantially rotating on the shaft 182.

When the first extended portion 152 is rotated, the second extended portion 156 is released from the coupling groove 240 and moved downwardly together with the first extended portion 152. Accordingly, the coupling between one side of the cover 200 and the case 100 is released.

The third extended portion 160 may move upwardly while being rotated. When it is rotated a preset angle or more, the third extended portion 160 contacts with the projected surface 124. The third extended portion 160 faces the projected surface 124, in contact, the rotation of the cover fixing unit 150 is restricted and the cover fixing unit 150 stands still in that state.

In some examples, the projected surface 124 and the third extended portion 160 are in surface-contact so that the third extended portion 160 may be restricted by the projected surface 124 and keep the contact state.

The state shown in FIGS. 6A and 6B is the state where only the cover fixing unit 150 is rotated. In this instance, the seating hole 236 keeps its state of being seated on the shaft 182.

Figure 7A:
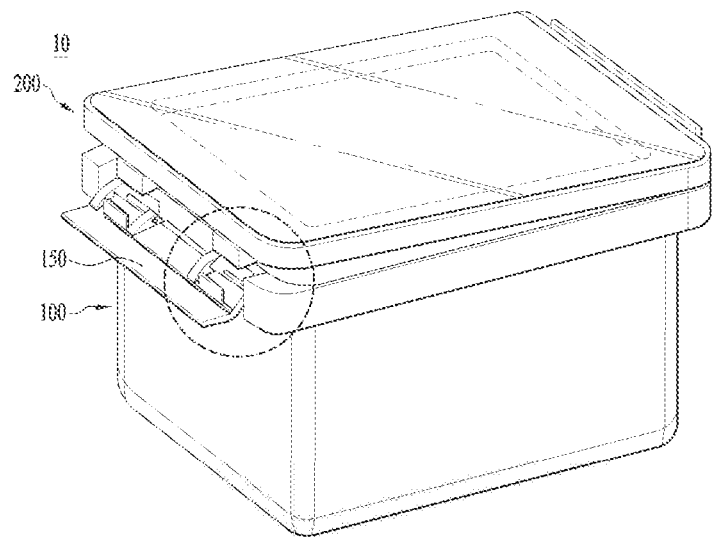
Figure 7B:
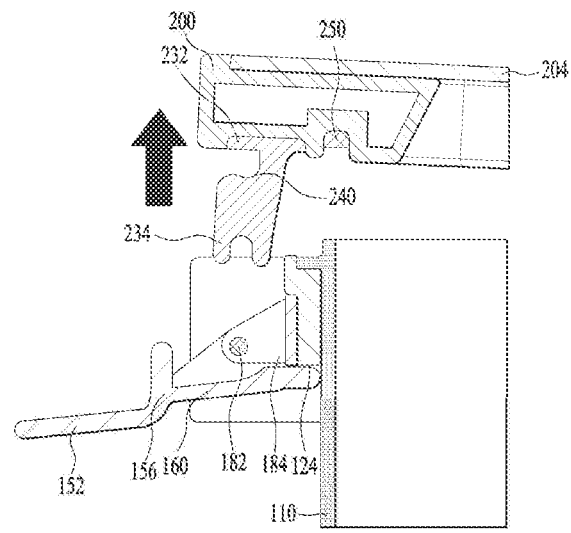

As shown in FIGS. 7A and 7B, the user is able to move one side of the cover 200 upwardly while holding the area of the cover 200 having the cover fixing unit 150 rotated downwardly.

Figure 8A:
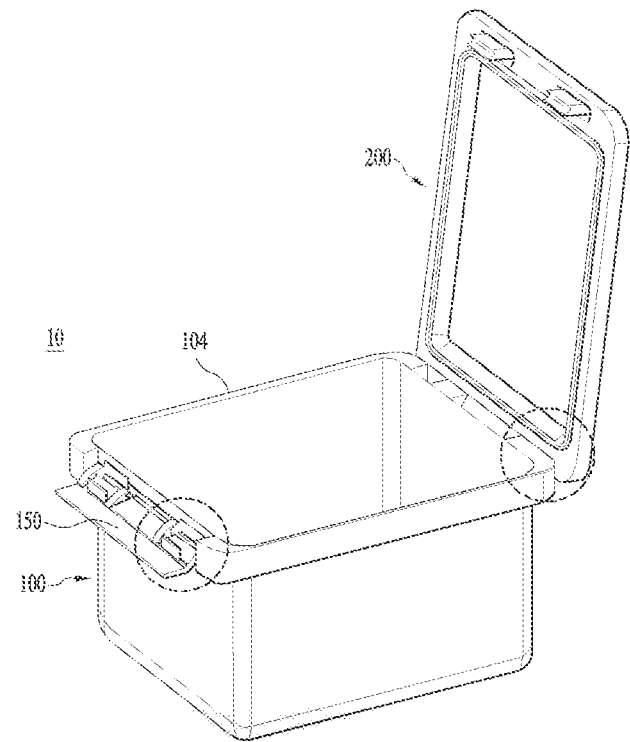
Figure 8B:
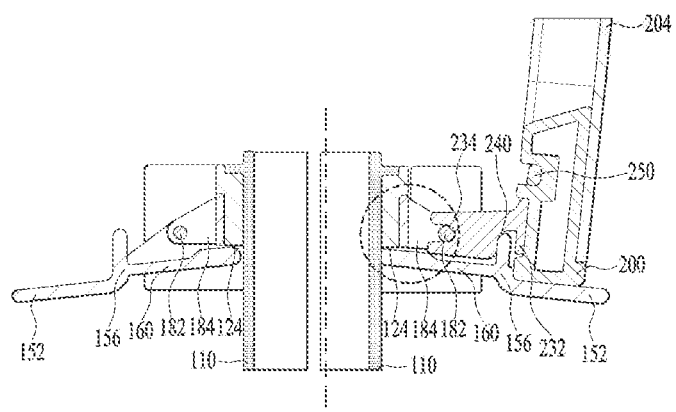

FIGS. 5B, 6B and 7B show example operations of one cover fixing unit 150. In FIG. 8B shows an example operation of the two cover fixing units 150.

Even when the user lifts one side of the cover 200, the other side of the cover 200 keeps its coupling to the case 100. In other words, the cover 200 is rotated with respect to the other side of the case 100 while keeping the coupling to the cover 200.

Accordingly, the user is able to store kimchi in the case 100 or take out the kimchi stored in the case 100, in a state where the opening 104 of the case 100 is completely open.

While the seating hole 236 of the hinge 230 provided in the other side of the cover 200 keeps the seated state on the shaft 182, the cover 200 is rotated on the shaft 182.

For example, when opening the opening 104 of the case 100, the user may not need to separate the cover 200 from the case 100 completely. Thus, the user may not need to find a place to put the cover 200 after separating it from the case 100, which can improve user friendliness when using the kimchi container.

In some examples, the other side of the cover 200 is rotated in a state of contacting with the first extended portion 152 of the cover fixing unit 150. Accordingly, the cover 200 may keep the secured state to the case 100.

In some implementations, the kimchi container may have a symmetrical shape with respect to the center thereof. Accordingly, the user is able to couple the cover 200 to the case 100 in a reverse direction, and the user need not make efforts to check or adjust the direction of the cover 200 when storing kimchi airtight.

In some examples, both opposite sides of the kimchi container may have the same shape with respect to the center and the same elements are arranged in each of the sides in symmetry. Accordingly, the user is able to separate and rotate the left side of the cover 200 from the case or separate and rotate the right side of the cover 200.

As the present features may be embodied in several forms without departing from the characteristics thereof, it should also be understood that the above-described implementations are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A container, comprising:
   a case comprising lateral walls and a bottom surface that define a storage space, the case defining an opening at a top surface of the case;
   a case coupler that is configured to couple to an upper edge of at least one of the lateral walls of the case, the case coupler comprising a shaft;
   a cover fixing unit configured to couple to the shaft of the case coupler and to rotate about the shaft;
   a cover configured to detachably couple to an upper side of the case coupler and configured to open and close at least a portion of the opening of the case; and
   a hinge that is coupled to the cover and that defines a seating portion configured to receive the shaft, the cover being configured to rotate about the shaft,
   wherein the cover fixing unit comprises cover fixing units that are located, respectively, at the lateral walls of the case that face each other.

2. The container of claim 1, wherein the seating portion comprises an open hole that is defined at a lower area of the hinge, and
   wherein the shaft is configured to insert into or be released from the seating portion through the open hole.

3. The container of claim 1, wherein the shaft comprises:
   a first end and a second end that are each configured to couple to the cover fixing unit; and
   a center portion that is located between the first end and the second end and that is configured to support the seating portion of the hinge.

4. The container of claim 1, further comprising a shaft supporter that is coupled to the case coupler and that includes the shaft.

5. The container of claim 1, wherein the cover fixing unit further comprises:
   a first extended portion that has a planar shape; and
   a second extended portion that extends from the first extended portion in a direction transverse to the first extended portion.

6. The container of claim 5, wherein the hinge defines a coupling groove configured to receive the second extended portion of the cover fixing unit.

7. The container of claim 6, wherein the coupling groove extends toward one of the lateral walls, and
   wherein the first extended portion is configured to contact the cover based on insertion of the second extended portion to the coupling groove.

8. The container of claim 1, wherein the cover fixing unit further comprises:
   a first extended portion that has a planar shape; and
   a third extended portion that extends downward from the first extended portion toward the bottom surface of the case.

9. The container of claim 8, wherein the case coupler includes a contact surface that protrudes from at least one of the lateral walls,
   wherein the third extended portion is configured to contact the contact surface of the case coupler based on rotation of the cover fixing unit about the shaft, and
   wherein the contact surface is configured to limit rotation of the cover fixing unit based on the third extended portion contacting the contact surface.

10. The container of claim 1, further comprising a handle located at a top surface of the cover.

11. The container of claim 10, wherein the cover comprises a handle shaft that is configured to rotatably couple to the handle, and
    wherein the handle shaft is located at an edge of the cover that corresponds to a side of at least one of the lateral walls that is configured to couple to the cover fixing unit.

12. The container of claim 10, wherein the cover fixing unit extends upward by a first distance vertically above the cover, and
    wherein the handle protrudes upward from the cover by a second distance that is less than or equal to the first distance.

13. The container of claim 11, wherein the handle comprises:
    a pair of first connecting portions, each first connecting portion having a first end rotatably coupled to the handle shaft; and
    a second connecting portion that connects second ends of the pair of first connecting portions to each other.

14. The container of claim 10, wherein the cover comprises a projection configured to limit a rotation angle of the handle less than 90 degrees.

15. The container of claim 1, wherein the cover comprises a transparent window in a center area of the cover.

16. The container of claim 1, wherein a shape of the container is symmetric with respect to a plane that passes through a center of one of the lateral walls.

17. The container of claim 16, wherein the case coupler, the cover fixing unit, and the hinge are arranged at a first side of the container with respect to the plane, and
    wherein the container further comprises a second case coupler, a second cover fixing unit, and a second hinge that are arranged at a second side with respect to the plane opposite to the first side.

18. The container of claim 1, wherein the case coupler comprises case couplers that are located at the lateral walls of the case that face each other, respectively.

19. The container of claim 18, wherein the hinge comprises hinges that are located at edges of the cover that face each other, respectively.

20. The container of claim 19, wherein each of the case couplers comprises a shaft configured to rotatably couple to one of the hinges, and
    wherein the cover is configured to rotate about the shaft that contacts one of the hinges.

* * * * *